United States Patent

Sommerer et al.

(10) Patent No.: US 7,722,421 B2
(45) Date of Patent: May 25, 2010

(54) HIGH TEMPERATURE CERAMIC COMPOSITE FOR SELECTIVE EMISSION

(75) Inventors: Timothy John Sommerer, Ballston Spa, NY (US); Peter Joel Meschter, Niskayuna, NY (US); Vikas Midha, Clifton Park, NY (US); Robert Arthur Giddings, Slingerlands, NY (US); David Jeffrey Bryan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1090 days.

(21) Appl. No.: 11/394,499

(22) Filed: Mar. 31, 2006

(65) Prior Publication Data

US 2007/0228985 A1    Oct. 4, 2007

(51) Int. Cl.
   *H01J 9/00* (2006.01)
(52) U.S. Cl. .................................. 445/23; 313/634
(58) Field of Classification Search ............ 313/636, 313/634, 504–506; 455/23–25
   See application file for complete search history.

(56) References Cited

U.S. PATENT DOCUMENTS

| | | | |
|---|---|---|---|
| 3,973,155 | A | 8/1976 | Warren et al. |
| 4,016,446 | A | 4/1977 | Cadoff |
| 5,079,473 | A | 1/1992 | Waymouth |
| 5,148,080 | A | 9/1992 | Van Thyne |
| 5,955,839 | A | 9/1999 | Jaffe et al. |
| 6,018,216 | A | 1/2000 | McIntosh |
| 6,024,915 | A | 2/2000 | Kume et al. |
| 6,204,598 | B1 | 3/2001 | Bruggemann et al. |
| 6,479,136 | B1 | 11/2002 | Nakanishi |
| 6,586,775 | B2 | 7/2003 | Hirayama |
| 6,611,085 | B1 | 8/2003 | Gee et al. |
| 6,768,256 | B1 | 7/2004 | Fleming et al. |
| 6,812,626 | B2 | 11/2004 | Perlo et al. |
| 6,829,421 | B2 | 12/2004 | Forbes et al. |
| 6,844,976 | B1 | 1/2005 | Firon et al. |
| 6,858,079 | B2 | 2/2005 | Norris et al. |

(Continued)

FOREIGN PATENT DOCUMENTS

EP    1575080    9/2005

(Continued)

OTHER PUBLICATIONS

Velev, O.D. et al., "Structured Porous Materials Via Colloidal Crystal Templating: From Inorganic Oxides to Metals", Advanced Materials, vol. 12, No. 7, Apr. 4, 2000, pp. 531-534, Wiley VCH Weinheim DE.

(Continued)

*Primary Examiner*—Joseph L Williams
(74) *Attorney, Agent, or Firm*—Mary Louise Gioeni

(57) ABSTRACT

A high temperature stable composition includes a first material and a second material interspersed within the first material so as to form a structure. The composition is structured such that the first and second materials maintain a periodicity of distribution between about 100 nm and about 1000 nm, and the composition is operable to reflect photons having a wavelength greater than about 700 nm and to emit or transmit photons having a wavelength between about 400 nm and about 700 nm at temperatures greater than about 2000 Kelvin for at least about 10 hours.

3 Claims, 6 Drawing Sheets

U.S. PATENT DOCUMENTS

| | | |
|---|---|---|
| 6,869,330 B2 | 3/2005 | Gee et al. |
| 6,871,523 B2 | 3/2005 | Ishizuka et al. |
| 6,979,105 B2 | 12/2005 | Leysath |
| 7,040,130 B2 | 5/2006 | Liu et al. |
| 7,049,735 B2 | 5/2006 | Ohkubo et al. |
| 7,085,038 B1 | 8/2006 | Etheridge, III et al. |
| 7,190,117 B2 | 3/2007 | Rosenbauer |
| 7,402,952 B2 | 7/2008 | Bunk et al. |
| 2002/0130600 A1 | 9/2002 | Bigio et al. |
| 2003/0071564 A1 | 4/2003 | Hirayama |
| 2003/0132705 A1 | 7/2003 | Gee et al. |
| 2003/0137845 A1 | 7/2003 | Leysath |
| 2004/0182847 A1 | 9/2004 | Ohkubo et al. |
| 2004/0232837 A1 | 11/2004 | King |
| 2004/0239228 A1 | 12/2004 | Perlo et al. |
| 2004/0252509 A1 | 12/2004 | Lin |
| 2004/0253443 A1 | 12/2004 | Anselmann et al. |
| 2005/0160964 A1 | 7/2005 | Champion et al. |
| 2005/0168147 A1 | 8/2005 | Innocenti et al. |
| 2005/0206300 A1 | 9/2005 | Perlo et al. |
| 2005/0263269 A1 | 12/2005 | Kaneko et al. |
| 2006/0006787 A1 | 1/2006 | Champion et al. |
| 2006/0008582 A1 | 1/2006 | Champion et al. |
| 2006/0071582 A1 | 4/2006 | Sakaue et al. |
| 2006/0071585 A1 | 4/2006 | Wang |
| 2006/0076868 A1 | 4/2006 | Pullini et al. |
| 2006/0103286 A1 | 5/2006 | Lambertini et al. |
| 2006/0103305 A1 | 5/2006 | Bunk et al. |
| 2006/0132014 A1 | 6/2006 | Horiuchi et al. |
| 2006/0170334 A1 | 8/2006 | Etheridge, III et al. |
| 2006/0171016 A1 | 8/2006 | Etheridge et al. |
| 2006/0175968 A1 | 8/2006 | Kimoto et al. |
| 2006/0196407 A1 | 9/2006 | Etheridge, III et al. |
| 2007/0044540 A1 | 3/2007 | Ohkubo et al. |
| 2007/0228951 A1 | 10/2007 | Sommerer et al. |
| 2007/0228986 A1 | 10/2007 | Sommerer et al. |
| 2007/0236144 A1 | 10/2007 | Sommerer et al. |

FOREIGN PATENT DOCUMENTS

| | | |
|---|---|---|
| EP | 1577957 | 9/2005 |
| EP | 1614654 | 1/2006 |
| JP | 2000267585 A | 9/2000 |
| WO | WO03019680 A1 | 3/2003 |
| WO | WO03058676 A2 | 7/2003 |
| WO | WO2004010461 A2 | 1/2004 |
| WO | 2004021451 | 3/2004 |
| WO | WO2004079056 A2 | 9/2004 |
| WO | WO2006/040872 | 4/2006 |
| WO | 2006045273 | 5/2006 |
| WO | 2006060995 | 6/2006 |
| WO | 2007063008 | 6/2007 |

OTHER PUBLICATIONS

Rugge, Allesandro et al.., "Tungsten Nitride Inverse Opals by Atomic Layer Decomposition", Nano Letters, vol. 3, No. 9, 2003, pp. 1293-1297.

Vonfreymann, Georg et al., "Tungsten Inverse Opals: The Influence of Absorption on the Photonic Band Structure in the Visible Spectral Region", Applied Physics Letters, vol. 84, No. 2, Jan. 12, 2004, pp. 224-226.

PCT Search Report—dated Sep. 13, 2007.

Bigio et al., "Investigation for Incandescent Lamp Efficiency Improvement"; Final Report for Contract No. 3034-1ABR-BR-94; Dec. 14, 1995.

(A)

(B)

(C)

HIGH TEMPERATURE CERAMIC COMPOSITE FOR SELECTIVE EMISSION

BACKGROUND

The presently claimed invention relates generally to a ceramic composite and related methods and systems for selective emission of radiation.

There are many classes and types of lighting devices available on the market today including incandescent lamps, discharge based lamps such as high intensity discharge (HID) and fluorescent lamps, as well as solid state devices such as Light Emitting Diodes (LEDs) and Organic LEDs (OLEDS). Each of these devices has certain advantages and disadvantages depending upon the application within which they are to be used.

Tungsten filament incandescent lamps for example have numerous advantages for indoor and outdoor lighting systems. These advantages include simplicity of use, pleasing color, instant start, dimmability and low cost, not to mention a very large installation base. However, because much of the input energy of incandescent lamps is radiated outside the visible spectrum, incandescent lamps tend to have low energy efficiencies (e.g., on the order of 17 lumens per watt (LPW) for a 100 watt (100 W) lamp rated at 120 volts (120V) and having a rated lifetime of 750 hours). In particular, only about nine percent (9%) of power supplied to incandescent lamps is radiated as visible light with the remaining power being radiated as waste heat. Despite the many inherent advantages of incandescent lamps, if their efficiency cannot be improved, they will continue to lose market share to compact fluorescent lamps, which have an advantage in efficacy, albeit at the expense of color, dimmability, and acquisition cost.

It has been suggested that one possible approach to improve the efficiency of incandescent lamps is through the use of photonic crystals to modify or suppress thermal radiation above a cutoff wavelength. However, all such suggested photonic crystal designs are limited by one or more factors including the materials and lattice structures employed, as well as the resulting efficiencies afforded.

For example, in U.S. Pat. No. 6,768,256 issued to Sandia Corporation (hereinafter the '256 patent), a photonic crystal light source is described that is said to provide an enhanced light emission at visible and infrared wavelengths (e.g., enhanced photonic density-of-states). In the '256 patent, the photonic crystal structure is configured in an inherently unstable stacked log pile design utilizing alternating layers of tungsten rods in an attempt to create a photonic band gap. Although some enhanced light emission is reported, the spacing between the tungsten rods ranges from 2.8 µm with a rod width of 1.2 µm to 4.2 µm with a rod width of 0.85 µm. This results in a band edge for the allowed band of energies occurring beyond 4 µm yielding a minimal increase in efficiency. In order for such a tungsten log pile design to provide a band gap that is applicable in a lighting device such as an incandescent lamp, the lattice spacing would need to be on the order of about 400 nm. However, at such a small scale, 400 nm tungsten rods become extremely unstable when exposed to temperatures common to an incandescent environment (e.g., at or above 1700 Kelvin) for as little as two hours.

FIGS. 1(A-C) illustrate an example of 400 nm tungsten rods having been exposed to temperatures of 300 Kelvin, 1500 Kelvin and 1700 Kelvin, respectively for a period of two hours. With reference to FIGS. 1(A-C) it can be easily seen that as the temperature is increased, the grain size within the rods increases toward the feature size causing the rods to become unstable. Similarly, other mechanisms such as Raleigh instability may cause the logs to spheroidize into droplets rendering the structures unstable at high temperatures.

Thus, although the prior art may suggest methods of improving efficiencies of incandescent lamps, all such suggested improvements fail to teach material and structural combinations at the appropriate scale that are predicted to be stable at temperatures above 1700 Kelvin for extended periods of time.

BRIEF DESCRIPTION

In accordance with one aspect of the disclosure, a high temperature stable composition is provided. The high temperature stable composition includes a first material and a second material interspersed within the first material so as to form a structure. The structure is such that the first and second materials maintain a periodicity of distribution between about 100 nm and about 1000 nm, and the composition is operable to reflect photons having a wavelength greater than about 700 nm and to emit or transmit photons having a wavelength between about 400 nm and about 700 nm at temperatures greater than about 2000 Kelvin for at least about 10 hours.

In accordance with another aspect of the disclosure, a high temperature ceramic composite is provided. The ceramic composite includes a first material and a second material arranged such that the first and second materials maintain a periodicity of distribution between about 100 nm and about 1000 nm. Furthermore, the first material is selected from the group consisting of carbides of transition metals, nitrides of transition metals, borides of transition metals, oxides of transition metals, and combinations thereof, and wherein the second material comprises a transition metal.

In accordance with a further aspect of the disclosure, a composition including a high temperature ceramic composite is described. The high temperature ceramic composite includes a first material and a second material arranged such that the first and second materials maintain a periodicity of distribution between about 100 nm and about 1000 nm. Furthermore, the first material is selected from the group consisting of carbides of transition metals, nitrides of transition metals, borides of transition metals, oxides of transition metals, and combinations thereof, and the second material comprises a gas phase.

In accordance with yet another aspect of the disclosure, a high temperature ceramic composite includes a first material and a second material arranged such that the first and second materials maintain a periodicity of distribution between about 100 nm and about 1000 nm, where the first material is selected from the group consisting of carbides of transition metals, nitrides of transition metals, borides of transition metals and combinations thereof. Furthermore, the second material comprises a material selected from the group consisting of HfC, NbC, W2C, TaC, ZrC, HfN, Nb2N, Ta2N, ZrN, HfB2, TaB2, ZrB2, W2B, HfO2, ZrO2, C and combinations of two or more thereof.

In accordance with still another aspect of the disclosure, a high temperature ceramic composite includes a high temperature ceramic composite having a first material and a second material arranged such that the first and second materials maintain a periodicity of distribution between about 100 nm and about 1000 nm, wherein the first material comprises a transition metal, and the second material comprises a material selected from the group consisting of HfC, NbC, W2C, TaC, ZrC, HfN, Nb2N, Ta2N, ZrN, HfB2, TaB2, ZrB2, W2B, HfO2, ZrO2, C and combinations of two or more thereof.

In accordance with another aspect of the disclosure, a method of operation is described. The method includes applying current to a composition comprising a first material and a second material interspersed within the first material to form a structure such that the first and second materials maintain a periodicity of distribution between about 100 nm and about 1000 nm. The method further includes heating the composition to a temperature greater than about 2000 Kelvin to cause the emission or transmission of photons having a wavelength between about 400 nm and about 700 nm and the reflection of photons having a wavelength greater than about 700 nm for a duration of at least about 10 hours.

DRAWINGS

These and other features, aspects, and advantages of the present invention will become better understood when the following detailed description is read with reference to the accompanying drawings in which like characters represent like parts throughout the drawings, wherein.

Figure 3:
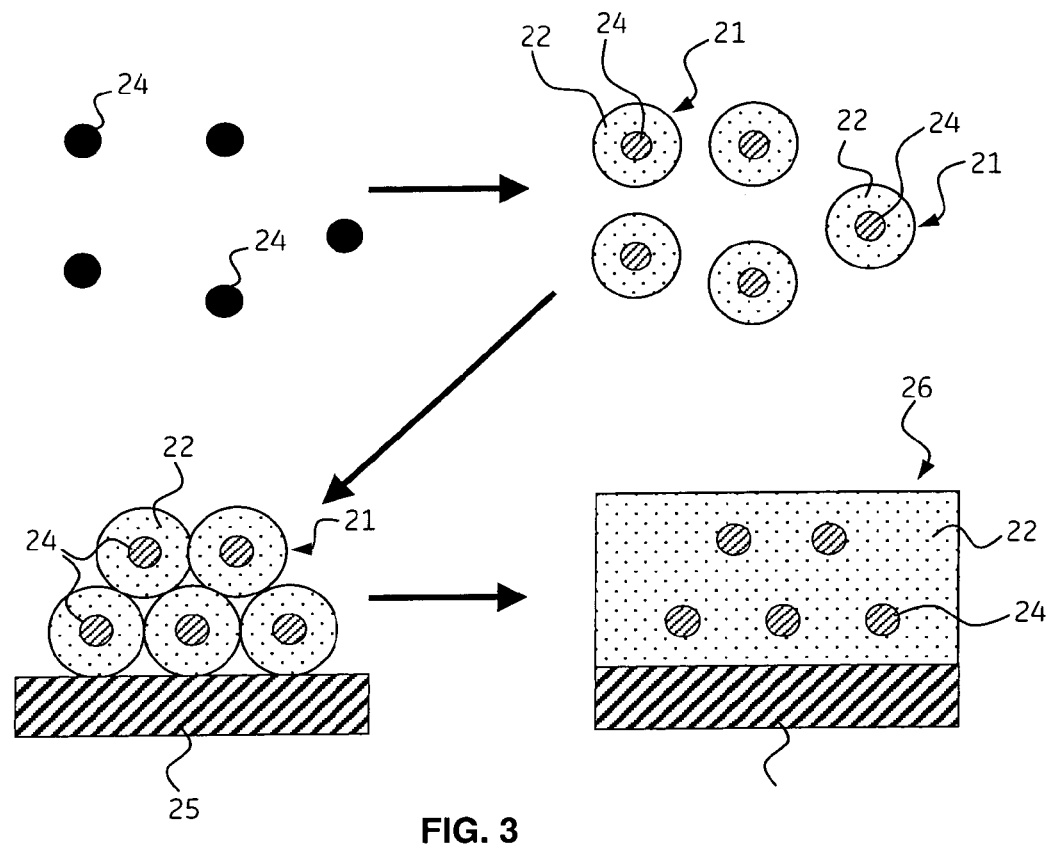
Figure 4:
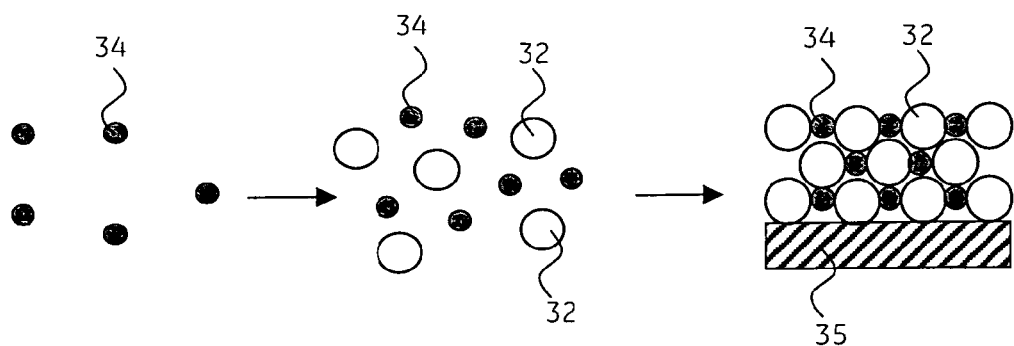
Figures 5, 5A, 5B, 5C, 5D:
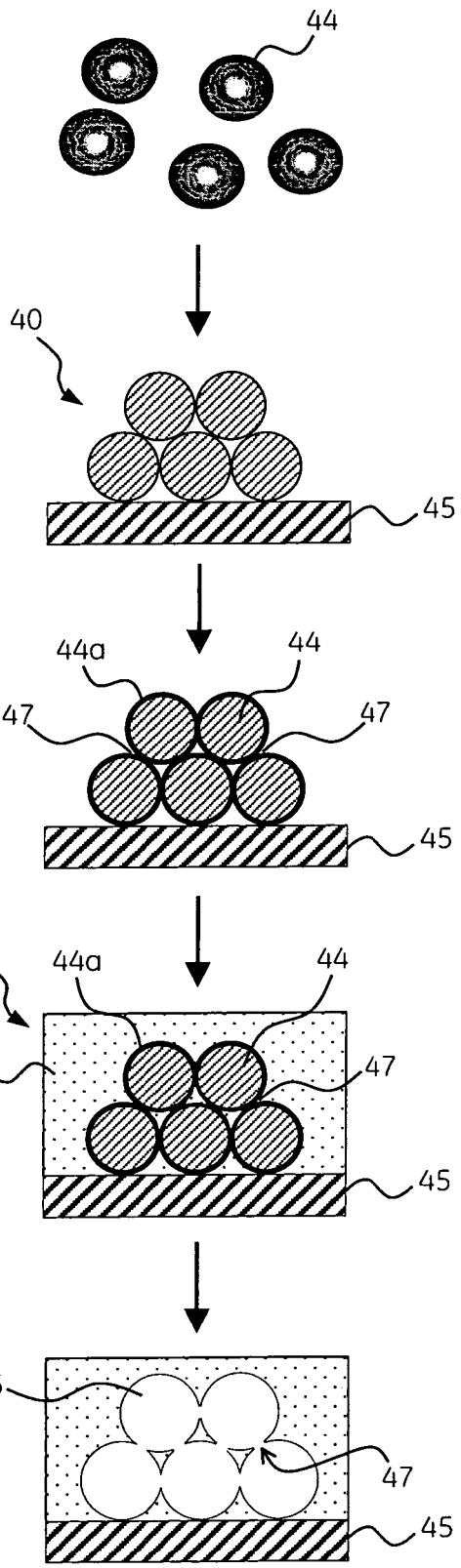
Figure 6:
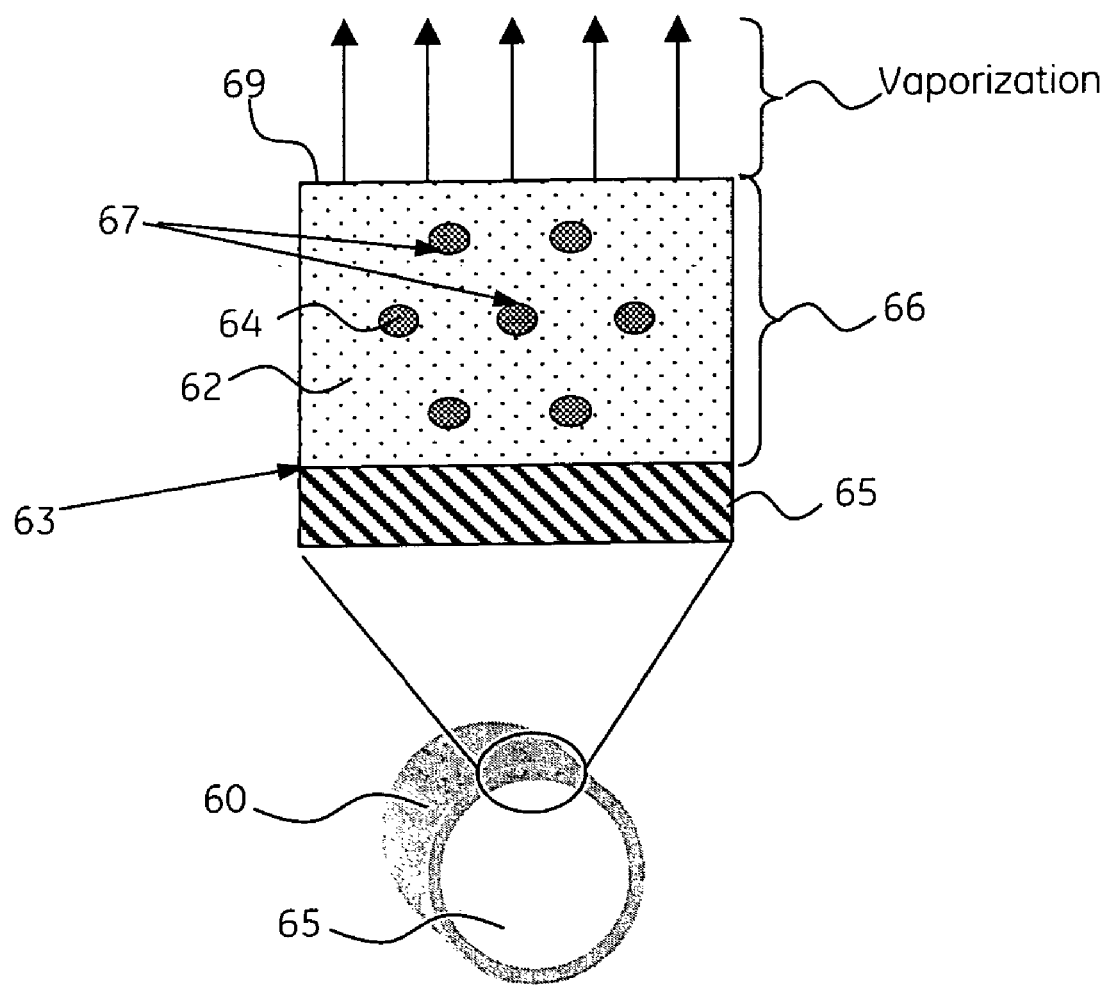
Figure 7:
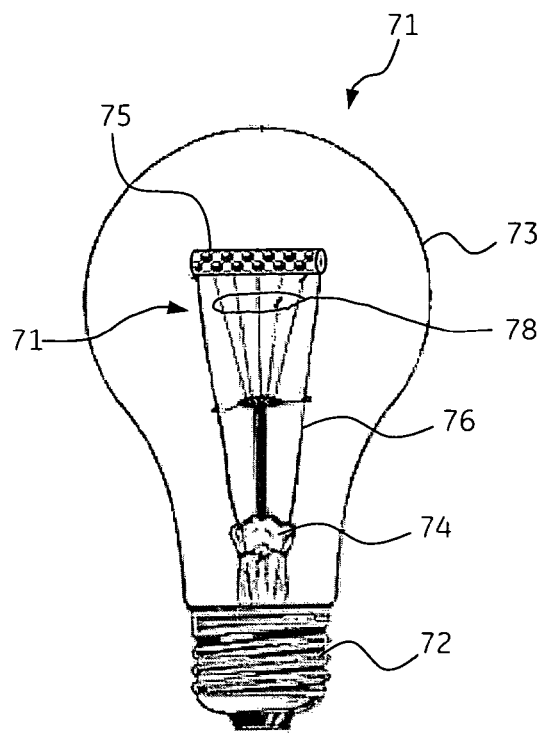
Figure 8:
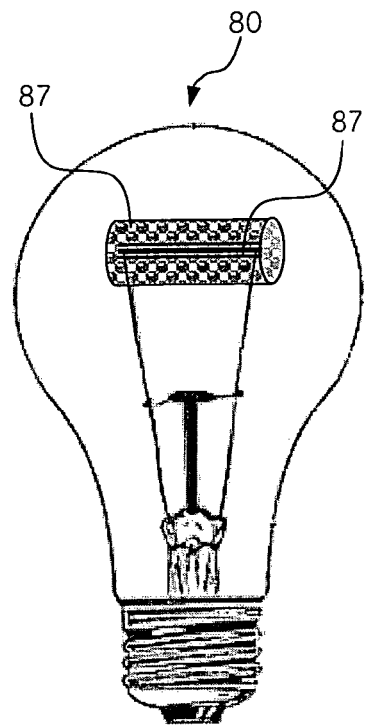
Figure 9:
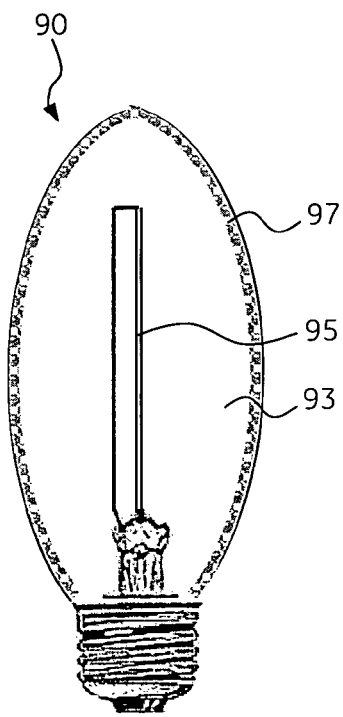
Figure 10:
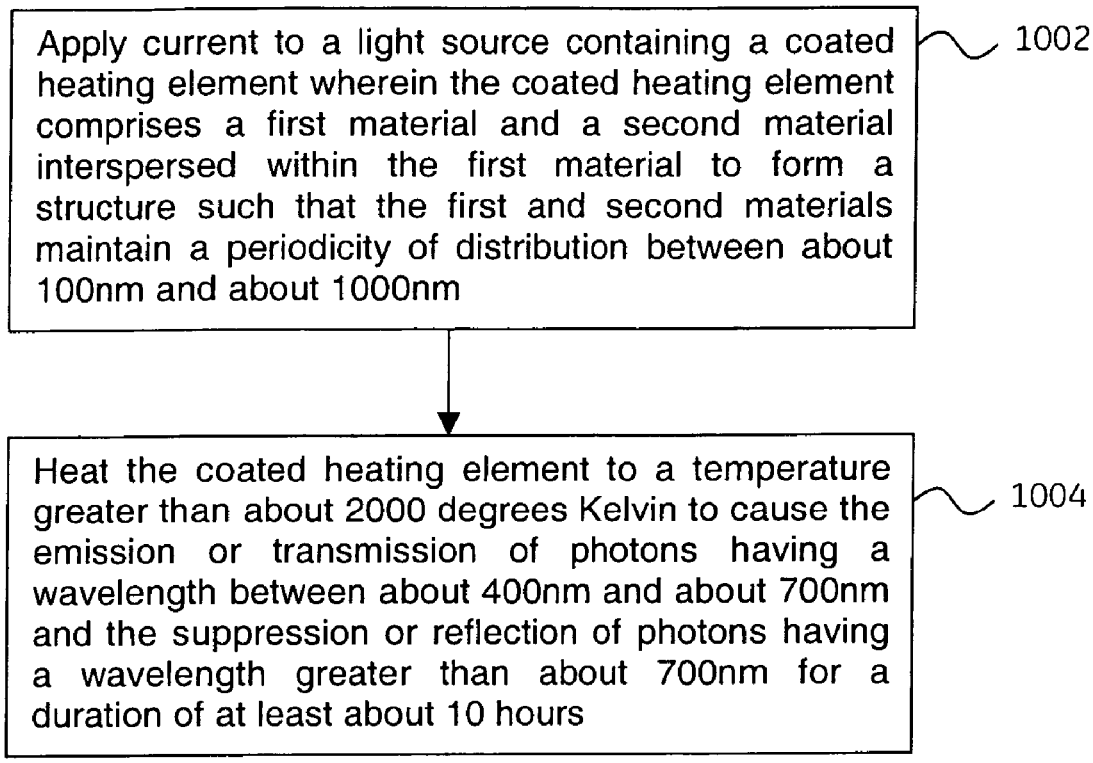

FIG. 3 schematically illustrates one embodiment of a ceramic composite configured in an opal lattice structure;

FIG. 4 schematically illustrates an alternative embodiment of a ceramic composite configured in an opal lattice structure;

FIG. 5 schematically illustrates one embodiment of a ceramic composite configured in an inverse opal lattice structure;

FIG. 6 is an exploded view illustrating one embodiment of a ceramic composite for selective emission in the form of a coating;

FIG. 7 illustrates an incandescent lamp including a ceramic composite configured as an emitter in accordance with one embodiment of the present invention;

FIG. 8 illustrates an incandescent lamp including a ceramic composite configured in a filter arrangement in accordance with another embodiment of the invention;

FIG. 9 illustrates an alternative embodiment of an incandescent lamp including a ceramic composite configured in a filter arrangement; and FIG. 10 is a flow diagram illustrating one embodiment of an operating method for the incandescent lamp of FIG. 7.

DETAILED DESCRIPTION

In accordance with one or more embodiments of the presently claimed invention, compositions, coatings, articles, light sources and associated methods will be described herein. In the following description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed so as to imply that these operations need be performed in the order they are presented, or that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous and interpreted as open ended unless otherwise indicated.

Embodiments of the presently claimed invention include a high temperature stable ceramic composite material (hereinafter referred to as a 'ceramic composite') designed to selectively reflect photons corresponding to at least one range of non-visible radiation wavelengths (such as ultraviolet and infrared) and to selectively emit or transmit photons corresponding to at least one range of visible radiation wavelengths. Because the ceramic composite selectively emits or transmits visible radiation while selectively reflecting the non-visible radiation that would otherwise be radiated as waste heat, it is possible to decrease the amount of input power that would otherwise be needed to achieve the same lumen output. This in turn can result in an increase in the efficiency of systems incorporating the ceramic composite material. Furthermore, due at least in part to the composite structures and material combinations utilized in the formation of the ceramic composite as described herein, the ceramic composite is designed to remain stable at high temperatures, such as above about 2000 Kelvin and preferably above about 2300 Kelvin. This may be contrasted with the prior art, which only teaches the use of materials and structures that are inherently unstable at such temperatures.

As noted above and in accordance with one embodiment of the invention, the ceramic composite is designed to remain stable at high temperatures, such as above about 2000 Kelvin and preferably above about 2300 Kelvin. The ceramic composite may be deemed 'stable' if the performance of the ceramic composite does not appreciably degrade (e.g. due to vaporization) through exposure to such high temperatures for a stipulated design lifetime. The stipulated design lifetime for the ceramic composite may depend upon the application in which the ceramic composite is to be used. For example, in lighting applications, it may be desirable for the ceramic composite to have a design lifetime spanning from as little as 10 hours up to and exceeding 1000 hours. In incandescent lamp applications for example, a reasonable design lifetime may be any length of time greater than about 100 hours and preferably greater than about 750 hours, which is comparable to the performance of today's incandescent lamps.

In accordance with one aspect of the presently claimed invention, selective photon reflection and selective photon emission or transmission by the ceramic composite is dependent upon the structural and material relationships between the constituent materials used within the ceramic composite structure. In one embodiment, the wavelengths of radiation to be reflected, emitted or transmitted by the ceramic composite may be determined based upon the dielectric properties of the respective ceramic composite materials and their relative distributions within the ceramic composite. In accordance with one embodiment, the ceramic composite may include a first material that exhibits characteristics of a metal and a second material that exhibits characteristics of a dielectric. Generally, metallic materials are conductive and have overlapping conductance and valence bands in their electronic structure characteristics, whereas dielectrics are highly resistant to the flow of electric current.

The dielectric function of a material generally describes the material's response to the electric field of an electromagnetic wave and involves the physical process of excitation of electrons from occupied to unoccupied electronic states. The dielectric function of a material may be used to identify whether a particular material exhibits characteristics of a metal or characteristics of a dielectric. Generally, the dielectric function of a material is a complex quantity including 'real' and 'imaginary' components. The dielectric function of a 'perfect dielectric' material (relative to vacuum having a dielectric function equal to 1) is a real constant greater than or equal to 1. For example, the dielectric functions of $HfO_2$ and $ZrO_2$ have real components that are approximately equal to four and have imaginary components that are approximately equal to zero. In contrast, the dielectric function of a 'perfect metal' is dependent on the contribution of intraband electronic transitions and may be characterized by the Drude formula:

$$\varepsilon = 1 - \frac{\omega_p^2}{\omega(\omega + j\gamma)},$$

where $\omega_p$ is the plasma frequency, $j=\sqrt{-1}$, $\gamma$ is the damping coefficient of the material and $\omega$ is the frequency of the incident electromagnetic wave. In practice, many materials exhibit complicated behaviors where the real and imaginary components of the respective dielectric functions depend on the frequency of the radiation and the temperature of the subject material. Accordingly, although many materials may not be characterized as perfect metals or perfect dielectrics, such materials may nonetheless be characterized as behaving more like a metal (also referred to as being "metal-like") or more like a dielectric. In accordance with one embodiment of the invention, a material may be characterized as being either a dielectric or a metal (where metals are defined to include metal-like materials) based upon the value of the Drude formula plasma frequency ($\omega_p$) identified for the material of interest. In accordance with one embodiment, materials having a plasma frequency ($\omega_p$) such that $\hbar\omega_p$ (where $\hbar$ is equal to Planck's constant reduced by $2\pi$ (i.e. $h/2\pi$)) is greater than about 3 eV and preferably greater than about 4 eV are characterized as being metals. Similarly, materials having a plasma frequency ($\omega_p$) such that $\hbar\omega_p$ is less than about 2 eV and preferably, less than about 1 eV are characterized as being dielectrics.

In one embodiment, the ceramic composite described herein includes a first material characterized as a metal and a second material characterized as a dielectric. Table 1 shows estimated Drude formula plasma frequency values as a function of temperature from first principles calculations of the electronic band structure of candidate materials for forming the ceramic composite. As illustrated, several refractory metals and ceramics of transition metal nitrides, carbides and borides exhibit strong metallic behavior in terms of their dielectric functions (e.g. as indicated by their plasma frequency ($\omega$p)). In contrast, refractory metal oxides such as, but not limited to $HfO_2$ and $ZrO_2$, exhibit dielectric properties having an $\omega_p$ such that $\hbar\omega_p$ is equal to about zero eV (0 eV).

TABLE 1

Drude parameters of metals and metal-like ceramics at temperatures T = 300 K and T = 2500 K.

| MATERIAL | $\hbar\omega_p$ (eV) (300 K) | $\hbar\omega_p$ (eV) (2500 K) |
| --- | --- | --- |
| W | 6.80 | 6.28 |
| Ta | 9.05 | 8.40 |

TABLE 1-continued

Drude parameters of metals and metal-like ceramics at temperatures T = 300 K and T = 2500 K.

| MATERIAL | $\hbar\omega_p$ (eV) (300 K) | $\hbar\omega_p$ (eV) (2500 K) |
| --- | --- | --- |
| Os | 7.46-8.74 | 6.99-8.25 |
| Re | 5.85-6.35 | 5.66-6.14 |
| NbC | 7.63 | 7.33 |
| HfC | 3.08 | 3.11 |
| HfN | 9.04 | 8.67 |
| $W_2C$ | 6.48-7.99 | 6.19-7.63 |

In one embodiment, a ceramic composite for selective emission as described herein may include an ordered array of nanoparticles of a first material interspersed within a thermodynamically compatible ceramic matrix according to a determined periodicity of distribution. For the purpose of this description, the term 'ceramic matrix' is intended to refer to a solid compound formed through the application of heat or heat and pressure between two or more materials where at least one of the materials is non-metal. In an alternative embodiment, the ceramic composite may include an ordered array of sphere-like nanovoids interspersed within a ceramic matrix according to a determined periodicity of distribution. In one embodiment, the nanovoids may contain a gas phase (where the term "gas phase" is defined herein to include a vacuum) depending upon the operating characteristics desired of the ceramic composite.

As used herein, the terms 'nanoparticle' and 'nanovoid' are respectively intended to refer to particles (whether in a solid or liquid phase) or voids having a diameter that measures less than 500 nm. In one embodiment, the nanoparticles described herein may have diameters that range from about 60 nm to about 350 nm. In one embodiment, the nanovoids may have diameters that range from about 300 nm to about 500 nm. Additionally, within the context of the ceramic composite described herein, the term 'interspersed' is used broadly to mean that nanoparticles or nanovoids are placed, positioned or formed at intervals within the ceramic matrix. Furthermore, the term 'periodicity of distribution' is intended to refer to the center-to-center spacing by which each of an array of interspersed nanoparticles or nanovoids is separated. In the event a specific numerical value for a periodicity of distribution is provided herein, a margin of error of ±10 percent may be assumed.

Figure 1:
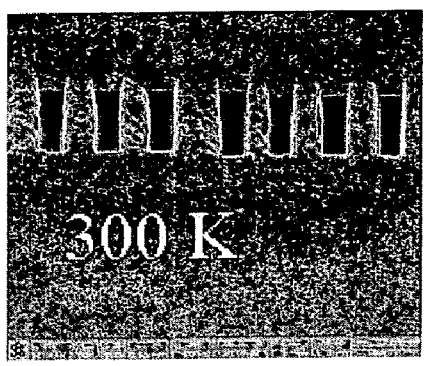
FIG. 1 illustrates examples of tungsten logs exposed to temperatures of 300 Kelvin, 1500 Kelvin and 1700 Kelvin.
Figure 1:
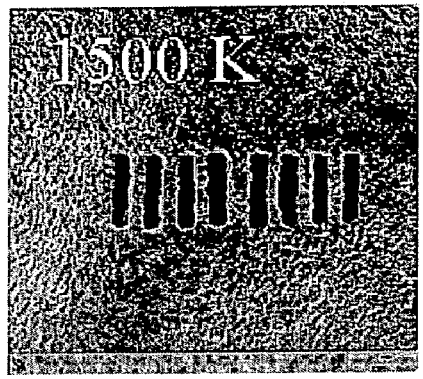
Figure 1:
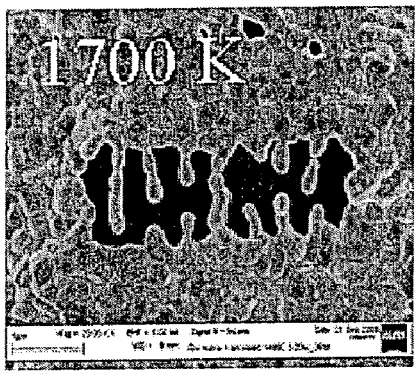
Figure 2:
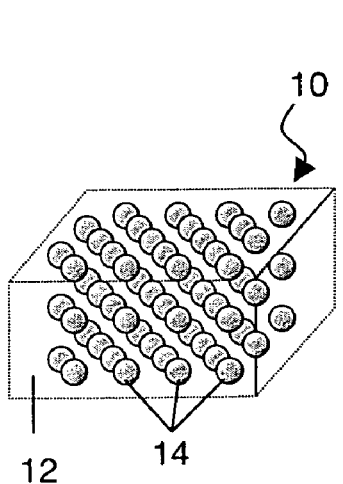
FIG. 2 illustrates two corresponding views of a high temperature ceramic composite in accordance with one embodiment of the present invention.
Figure 2:
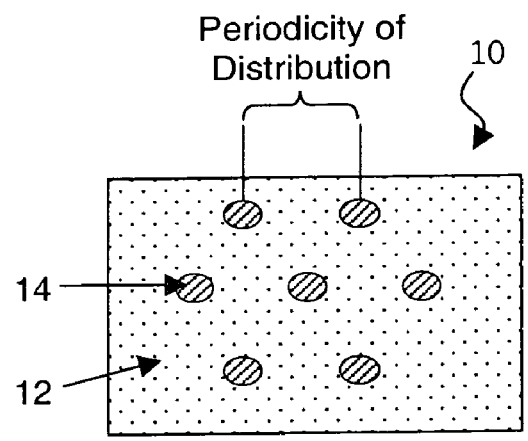

FIG. 2 illustrates two corresponding views of a section of a high temperature ceramic composite in accordance with one embodiment of the present invention. The illustrated ceramic composite 10 of FIG. 2 is intended to generically represent both an opal lattice structure as well as an inverse opal lattice structure (both described in further detail below). In the illustrated embodiment of FIG. 2, the ceramic composite 10 includes a first region 12 and a second region 14. It should be noted that in certain instances, the illustrated size of region 14 may appear out of scale with respect to the illustrated size of region 12. In one embodiment, the first region 12 may comprise a material in a solid phase whereas the second region 14 may comprise a material in a solid, liquid or gas phase. In one embodiment, instances of the second region 14 may be interspersed within the first region 12 so as to maintain a periodicity of distribution between about 100 nm and about 1000 nm. In one embodiment, the first region 12 and the second region 14 maintain a periodicity of distribution of about 350 nm. The first region 12 and the second region 14 may respectively comprise first and second materials selected and structured such that when heated, the ceramic composite 10 is operable to reflect photons having wavelengths greater than about 700 nm and to emit or transmit photons having wavelengths between about 400 nm and about 700 nm. Moreover, materials associated with the first region 12 and the second region 14 further may be selected and structured so as to selectively reflect, emit or transmit photons at temperatures greater than about 2000k, and preferably greater than 2300k, for a duration of at least about 10 hours and even up to or exceeding about 750 hours.

In accordance with various embodiments, the first region 12 and the second region 14 of the ceramic composite 10 may each be occupied by one or more ceramic materials formed from carbides, nitrides, borides or oxides of transition metals including but not limited to HfC, NbC, $W_2C$, TaC, ZrC, HfN, $Nb_2N$, $Ta_2N$, ZrN, $HfB_2$, $TaB_2$, $ZrB_2$, $W_2B$, $HfO_2$, and $ZrO_2$. As used herein and unless otherwise noted, transition metals are intended to refer to elements corresponding to groups 3 to 12 (i.e., the d-block) of the periodic table of elements.

In accordance with a first structural arrangement for the ceramic composite, the first region 12 of the ceramic composite 10 may be occupied by a dielectric and the second region 14 may be occupied by a metal or a metal-like ceramic. For the purposes of this description, dielectrics include but are not limited to carbon (C) and oxides of transition metals such as $HfO_2$ and $ZrO_2$. Similarly, for the purposes of this description, metal-like ceramics include but are not limited to HfC, NbC, $W_2C$, TaC, ZrC, HfN, $Nb_2N$, $Ta_2N$, ZrN, $HfB_2$, $TaB_2$, $ZrB_2$, $W_2B$. In a more particularized embodiment, the first region 12 may be occupied by a dielectric such as carbon or an oxide of a transition metal, while the second region 14 may be either occupied by one or more transition metals (including but not limited to W, Os, Re, Mo, Au, Ta and Nb) or by one or more metal-like ceramics (including but not limited to HfC, NbC, $W_2C$, TaC, ZrC, HfN, $Nb_2N$, $Ta_2N$, ZrN, $HfB_2$, $TaB_2$, $ZrB_2$ and $W_2B$).

In accordance with a second structural arrangement for the ceramic composite 10, the first region 12 may be occupied by a metal or metal-like ceramic and the second region 14 may be occupied by a dielectric. In one embodiment, the second region 14 may be occupied by an array of sphere-like nanovoids interspersed within or with respect to the first region 12 so as to act like a dielectric. In one embodiment, the first region 12 may be formed from one or more metals or metal-like ceramic materials including but not limited to HfC, NbC, $W_2C$, TaC, ZrC, HfN, $Nb_2N$, $Ta_2N$, ZrN, $HfB_2$, $TaB_2$, $ZrB_2$, and $W_2B$. The nanovoids may further include a gas phase such as vacuum or air, or an additional fill gas provided to further tailor the performance of the ceramic composite 10 as will be described in further detail below.

In accordance with yet a further structural arrangement, the ceramic composite 10 may be configured in the form of a rod lattice structured from alternating layers of evenly spaced rows of a metal or metal-like material as described above formed in the shape of rods (e.g. where the length of the rod is substantially longer than the corresponding width or height). In one embodiment, the rods may be separated according to a determined periodicity of distribution by a dielectric material as described above.

FIG. 3 schematically illustrates one embodiment of a ceramic composite 26 configured in an opal lattice structure, where the term "opal lattice" may refer to a close-packed ball lattice. In the illustrated embodiment, the ceramic composite 26 may be formed into an opal lattice by assembling an array of sphere-like composite particles 21. Each such composite particle 21 may in turn be formed from a core nanoparticle 24 of a first material that is coated or otherwise surrounded by a dielectric material 22. In one embodiment, the core nanoparticles 24 may represent a metal or metal-like material (e.g., as may be determined by the plasma frequency for the material). Since the lattice spacing within the ceramic composite 26 is a function of the size of the composite particles 21, the size of the core nanoparticles 24 and the dielectric material 22 may be tailored to achieve the desired lattice properties. In one embodiment, the core nanoparticles may have a diameter that ranges in size from about 60 nm to about 350 nm while the dielectric material 22 may range in size such that diameter of the composite particle 21 ranges between about 300 nm and about 500 nm. In one embodiment, the composite particles 21 may be formed into a single monolithic ceramic composite 26 by first assembling the composite particles 21 and in turn sintering the composite particle assembly. In one embodiment, the composite particles 21 may be assembled directly on a substrate such as the illustrated heating element 25. As will be described in further detail below, although in certain embodiments the novel ceramic composite may be coated or otherwise assembled on a substrate or heating element, it is also envisioned that the ceramic composite can be emissive without the need for such an underlying substrate or heating element. In such a case, the ceramic composite could be heated through direct application of current or through the use of inductive heating techniques, for example.

FIG. 4 schematically illustrates an alternative embodiment of a ceramic composite configured in an opal lattice structure. In FIG. 4, nanoparticles 34 of a first material having a first dielectric function are combined with nanoparticles 32 of a second material having a second dielectric function and then assembled onto a substrate or heating element (e.g. heating element 35) to form a lattice structure as shown. In one embodiment, the nanoparticles 34 of the first material may represent one or more metals or metal-like materials and the nanoparticles 32 of the second material represent one or more dielectric materials.

In one embodiment, the dielectric material 22 of FIG. 3 and the nanoparticles 32 of FIG. 4 may represent carbides of transition metals, nitrides of transition metals, borides of transition metals, oxides of transition metals, or combinations thereof. In contrast, the nanoparticles 24 of FIG. 3 and the nanoparticles 34 of FIG. 4 may represent transition metals including but not limited to W, Os, Re, Mo, Au, Ta, Nb, C, Hf, Zr and combinations thereof. In a more particularized embodiment, the dielectric material 22 and the nanoparticles 32 of FIG. 4 may represent ceramic materials including, but not limited to C, $ZrO_2$ and $HfO_2$, while the nanoparticles 24 of FIG. 3 and the nanoparticles 34 of FIG. 4 may represent W, Os, Re, Mo, Au or combinations thereof.

FIG. 5 schematically illustrates one embodiment of a ceramic composite configured in an inverse opal lattice structure. To form an inverse opal structure, dielectric nanoparticles 44 may first be assembled onto a substrate or heating element (e.g. heating element 45) to form a lattice structure 40 (FIG. 5A). In one embodiment, the dielectric nanoparticles 44 include silica ($SiO_2$) nanoparticles. The dielectric nanoparticles 44 may be assembled through one or more assembly techniques known or to be developed for assembling nanoparticles. For example, suitable assembly techniques for assembling the dielectric nanoparticles 44 may include but are not limited to evaporation, electrophoresis, and Langmuir-Blodgett techniques.

In one embodiment, a dielectric shell 44a may be formed around the dielectric nanoparticles 44 to provide additional contact between the dielectric nanoparticles 44 to facilitate bridging of the nanoparticles (FIG. 5B). In one embodiment, a silica shell may be formed on silica nanoparticles 44. Once assembled, a metal or metal-like material 42 or a precursor to be converted into a metal-like material may be infiltrated around the dielectric nanoparticles 44 using one or more methods such as chemical vapor deposition (CVD) or electroplating (FIG. 5C). In the event a precursor such as tungsten metal is used, it can be converted into a WC or $W_2C$ ceramic by high temperature carburization through the use of a carbon-containing gas such as methane. In a similar manner, nitrides, carbides and other refractory compounds used as a precursor can also be made by nitriding or carburizing the parent metal.

Once the metal or metal-like material 42 has been formed, the dielectric nanoparticles 44 may be removed through etching or other means to form nanovoids 46 within the metal or metal-like material 42 resulting in formation of the inverse opal lattice. In one embodiment, bridges 47 may be formed between the silica nanoparticles 44 (through e.g., CVD or sintering) (FIG. 5D).

In one embodiment, the ceramic composite for selective emission described herein may be configured as a composition or coating that may be used in a variety of high-temperature applications. In one non-limiting example, the ceramic composite may be used in high temperature lighting applications such as those associated with incandescent lamps. FIGS. 6-9 illustrate various non-limiting examples of how the ceramic composite for selective emission may be adapted for use in certain lighting applications.

FIG. 6 is an exploded view illustrating one embodiment of a ceramic composite for selective emission in the form of a coating. As illustrated, the ceramic composite 60 may be coated on a heating element 65 as shown. In a non-limiting example, the heating element 65 may represent e.g., a rod, coil or ribbon formed from a material such as but not limited to carbon, tungsten, osmium, rhenium and molybdenum. As shown in the exploded view, the ceramic composite 60 may include a dielectric material in the form of a ceramic matrix 62, and metal or metal-like nanoparticles 64. Alternatively, the ceramic composite 60 may include a metal-like ceramic matrix 62, and nanovoids in place of nanoparticles 64. The intersections between the ceramic matrix 62 and the nanoparticles 64 define particle-ceramic interfaces 67, whereas the intersection between the ceramic matrix 62 and the heating element 65 define a ceramic-heating element interface 63.

In one embodiment, the ceramic composite 60 may be configured such that during operation the ceramic composite 60 is not reduced in thickness (66) by an amount that would degrade performance of the ceramic composite 60 over a stipulated lifetime. In one embodiment, the ceramic composite 60 is configured such that performance of the ceramic composite does not degrade when heated to temperatures greater than about 2000 Kelvin and preferably greater than about 2300 Kelvin for periods of at least about 10 hours, preferably at least about 100 hours, and more preferably at least about 750 hours. The term "thickness" of the ceramic composite 60 is defined herein to refer to the distance measured in a direction perpendicular to the heating element 65 from the ceramic-heating element interface 63 to the emission surface 69. In one embodiment, the thickness of the ceramic composite may range between about 3 and 30 layers where a layer is defined by the diameter of the nanoparticles or nanovoids. For example, a ceramic composite having a periodicity of distribution of about 350 nm and having a thickness of about 10 layers may result in a ceramic composite having a total measurable thickness of about 3 μm. In one embodiment, the ceramic composite may be coated on a heating element having a diameter or cross-section measuring between about 25 μm and about 75 μm.

In accordance with one or more embodiments, the ceramic composite of the presently claimed invention may be configured as an emitter or as a filter. In an emitter arrangement, the ceramic composite may contribute wholly or in part to photon emission (i.e., becomes emissive) when heated. As alluded to above, the ceramic composite may be heated directly or through application of current to an underlying heating element. If the ceramic composite is emissive, then it may be generally desirable to have high emittance in the visible radiation wavelengths and to have low emittance in the infrared radiation wavelengths.

In a filter arrangement, the ceramic composite may be spaced apart from a heating element to selectively reflect infrared radiation and transmit visible radiation emitted from the heating element. By reflecting the infrared energy back onto the heating element, the heat flux to the heating element can be increased thereby decreasing the amount of input energy (e.g., voltage and current) required to attain the same lumen output.

FIG. 7 illustrates an incandescent lamp including a ceramic composite configured as an emitter in accordance with one embodiment of the present invention. As illustrated in FIG. 7, incandescent lamp 70 may include a base 72, a light-transmissive envelope 73 coupled to the base, and an emitter structure 71 coupled to the base 72. The base 72 is where the electrical contact for the lamp is made and as such, may be fabricated out of any conductive material such as brass or aluminum. The light-transmissive envelope 73 may be fabricated out of glass and may take on any of a wide variety of shapes and finishes.

The emitter structure 71 is coupled to the base and may include a heating element 75 (also referred to as a filament), lead wires 76, support wires 78, and a stem press 74. The lead wires 76 carry the current from the base 72 to the heating element 75. The lead wires 76 may be made of copper from the base 72 to the stem press 74 and may be made of nickel or nickel-plated copper from the stem press 74 to the heating element 75. The stem press 74 may be a glass-based structure that holds the emitter structure 71 in place. The stem press 74 may include an airtight seal around the lead wires 76. In order to balance the coefficients of expansion, the stem press 74 may further include a copper sleeve through which the lead wires 76 are passed. The support wires 78 are used to support the heating element 75 and may be made from molybdenum, for example. The heating element 75 may be a straight wire, a coil, or a coiled-coil. In one embodiment the heating element 75 may represent a filament comprising one or more materials such as W, C, Os, Re, Mo, Ta and Nb.

With continued reference to FIG. 7, the heating element 75 may include a ceramic composite operable to reflect photons having a wavelength greater than about 700 nm and to emit or transmit photons having a wavelength between about 400 nm and about 700 nm at temperatures greater than about 2000 Kelvin and preferably greater than 2300 Kelvin for at least about 10 hours, preferably at least 100 hours, and more preferably for at least 750 hours. The ceramic composite may include a first material and a second material interspersed within the first material to form a structure such that the first and second materials maintain a periodicity of distribution between about 100 nm and about 1000 nm. In one embodiment, the first material may be selected from a group of dielectrics including carbon as well as carbides of transition metals, nitrides of transition metals, borides of transition metals, oxides of transition metals, and combinations thereof. The second material may be selected from a group of materials including W, Os, Re, Mo, Au, Ta, Nb, C, Hf, Zr and combinations thereof, or from a group of metal-like ceramics including HfC, NbC, $W_2C$, TaC, ZrC, HfN, $Nb_2N$, $Ta_2N$, ZrN, $HfB_2$, $TaB_2$, $ZrB_2$, $W_2B$ and combinations thereof. In an alternative embodiment, the first material may be selected from a group of metals or metal-like ceramics including carbides of transition metals, nitrides of transition metals, borides of transition metals, and combinations thereof, whereas the second material may be may be selected from a group of dielectrics including carbon and oxides of transition metals. In yet a further embodiment, the first material may be selected from a group of metals or metal-like ceramics whereas the second material may represent a gas phase. In one embodiment, the ceramic composite may be formed directly on the heating element 75.

In accordance with one embodiment of the invention, a vacuum may be maintained within the light-transmissive envelope 73. In the event the vaporization rate of the ceramic composite coated on or functioning as the heating element 75 is deemed to be too great for a desired lifetime, an additional gas phase (also referred to as a fill gas) may be added within the light-transmissive envelope 73. In one embodiment, the lamp fill gas may be chosen so as to stabilize operation of the lamp and thereby increase the rated lifetime of the lamp. In a ceramic composite coating including a dielectric ceramic matrix and a metal, the combination of the ceramic matrix and fill gas composition may be selected such that partial pressures of critical vaporizing species are low and the ceramic composite coating vaporization does not endanger retention of the coating over the design lifetime.

FIG. 8 illustrates an incandescent lamp including a ceramic composite configured in a filter arrangement in accordance with another embodiment of the invention. The incandescent lamp 80 is substantially similar to the incandescent lamp 70 of FIG. 7, however the incandescent lamp 80 of FIG. 8 includes a ceramic composite 87 spaced apart from and optically aligned with the heating element 85. With such a filter arrangement, infrared energy may be reflected back upon the heating element while allowing the visible light to pass. As such, the visible light output occurs primarily due to emission from the underlying heating element that is in turn filtered by the ceramic composite. In one embodiment, the ceramic composite operates to selectively reflect infrared radiation from the emitter while selectively passing or transmitting visible radiation.

FIG. 9 illustrates an alternative embodiment of an incandescent lamp including a ceramic composite configured in a filter arrangement. The incandescent lamp 90 is also similar to the incandescent lamp 70 of FIG. 7, however the incandescent lamp 90 of FIG. 9 includes a ceramic composite filter 97 coated on the interior surface of the light-transmissive envelope 93. The filter reflects infrared radiation back on to the heating element 95 of the incandescent lamp and only selectively transmits visible light.

FIG. 10 is a flow diagram illustrating one embodiment of an operating method for the incandescent lamp of FIG. 7. At block 1002, current is applied to a light source (such as incandescent lamp 70) containing a coated heating element, wherein the coated heating element comprises a first material and a second material interspersed within the first material to form a structure such that the first and second materials maintain a periodicity of distribution between about 100 nm and about 1000 nm. At block 1004, the heating element is heated to a temperature greater than about 2000 Kelvin and preferably greater than 2300 Kelvin to cause the emission or transmission of photons having a wavelength between about 400 nm and about 700 nm and the reflection of photons having a wavelength greater than about 700 nm for at least about 10 hours, and preferably at least about 750 hours.

In accordance with one embodiment of the invention, a unique set of material screening principles and design criteria is described herein for identifying novel material combinations and structural configurations for making a high temperature stable ceramic composite for selective emission. More specifically, in order for such a ceramic composite to provide a desired luminous efficacy of at least 20 LPW while exposed to temperatures of at least 2000 Kelvin and preferably at least 2300 Kelvin for periods of more than about 10 hours (and even up to and exceeding 750 hours), the candidate materials were screened according to the following criteria. Although the following description makes reference to FIG. 6, the material screening principles and design criteria described herein should not be read as being limited to only ceramic composite coatings. Rather, such material screening principles and design criteria are equally applicable to all ceramic composite embodiments and reference to FIG. 6 is merely intended to be illustrative.

Referring to FIG. 6 once again, it has been determined that the ceramic matrix 62 should be chemically compatible with both the nanoparticles 64 (e.g., at the particle-ceramic interfaces 67) and the underlying heating element 65 (e.g. at the ceramic-heating element interface 63). Additionally, the ceramic composite 60 should have a sufficiently low rate of vaporization in a high temperature environment such that the majority of the ceramic composite 10, independent of the form it may take, remains substantially intact when operative in an incandescent lamp atmosphere over a desired design lifetime. In one embodiment, the design lifetime is at least 10 hours, preferably at least 100 hours, and more preferably at least about 750 hours. Furthermore, the constituent materials of the ceramic composite 60 should have a sufficient contrast in dielectric functions so as to selectively reflect photons within at least one range of non-visible wavelengths and to selectively emit or transmit photons within at least one range of visible wavelengths.

For example, in accordance with one embodiment, if the maximum allowable vaporization rate of the ceramic composite 60 is chosen such that no more than 10 percent of the ceramic composite 60 is allowed to be vaporized over a given design lifetime, then the vaporization lifetime of the ceramic matrix 62, which is in excess of the design lifetime, at 2300 K can be expressed by equation [1]:

$$t(h) = 7.7619 \times 10^{-5} \cdot \left(\frac{\rho_{ceramic}}{M_{ceramic}}\right) \cdot \frac{1}{p^*} \qquad \text{EQ. [1]}$$

where $\rho_{ceramic}$ is the mass density (g cm$^{-3}$) of the ceramic matrix 62, $M_{ceramic}$ is the molar mass (g mole$^{-1}$) of the ceramic matrix 62, and p* (atm) is the equilibrium vapor pressure of the major vaporizing species at the temperature of interest.

For example, assume tantalum carbide of initial stoichiometry $Ta_{0.513}C_{0.487}$ is a candidate ceramic matrix. Its density $\rho_{ceramic}$=14.3 g cm$^{-3}$, its molar mass $M_{ceramic}$=192.959 g mole$^{-1}$, and the vapor pressure of the most volatile species, Ta, $p^*_{Ta}$=5.0×10$^{-13}$ atm at a filament temperature of 2300 K. Therefore, the predicted time (t) to remove 10 percent of a 3 μm thick $Ta_{0.513}C_{0.487}$ coating at 2300 K is 1.15×10$^7$ hours. Since 1.15×10$^7$ hours is much greater than the presently desired lifetime of 750 hours, $Ta_{0.513}C_{0.487}$ may be considered a suitable ceramic matrix with respect to vaporization resistance for this lifetime. Further, the equivalent predicted time for 10 percent coating loss at 2500 K for the same candidate ceramic matrix is $3.62\times10^5$ hours, which is also much greater than 750 hours.

In some cases in which the candidate ceramic matrix has too high of a vaporization rate in a substantially inert fill gas atmosphere (such as that provided by an incandescent lamp), the vaporization rate can be reduced by adding to the fill gas a small amount of a gaseous substance that has the effect of lowering the vapor pressure p* of the major vaporizing species. Addition of an appropriate amount of a stabilizing species increases the vaporization lifetime according to equation [1] and makes the ceramic matrix a suitable candidate for the ceramic composite 60. In another example, hafnium nitride (HfN) has a density $\rho_{ceramic}=13.8$ g cm$^{-3}$, a molar mass $M_{ceramic}=192.5$ g mole$^{-1}$, and a vapor pressure of the most volatile species, Hf(g), $p^*_{Hf}=8.2\times10^{-8}$ atm at a heating element temperature of 2300 K. The predicted time to remove 10 percent of a 3 micrometer thick HfN coating at 2300 K in an inert atmosphere (e.g., pure Ar) is 68 hours. Since this is much less than the presently desired lifetime of 750 hours, HfN may not be deemed a suitable ceramic matrix with respect to vaporization resistance for the desired lifetime.

The fill gas composition of a 100 W A-line incandescent lamp is 95 percent Ar and 5 percent N$_2$ at approximately atmospheric pressure when such a lamp is in operation. Equilibrating this fill gas with a HfN coating determines the vapor pressure of Hf(g) according to chemical reaction (A):

$$HfN = Hf(g) + \tfrac{1}{2}N_2(g) \tag{A}$$

as $p_{Hf}=7.4\times10^{-11}$ atm. The predicted time to remove 10 percent of a 3 micrometer thick HfN coating in a fill gas containing 5 percent N$_2$, corresponding to a N$_2$ pressure of 38 Torr, is 75577 hours, which is much greater than the presently desired lifetime of 750 hours according to equation [1]. Continuing to utilize the standard fill gas for a high-wattage incandescent lamp, therefore, renders HfN a suitable ceramic matrix for a ceramic composite as defined herein. Similarly, at a heating element temperature of 2500 K, the predicted time to remove 10 percent of a 3 micrometer thick HfN coating in a 100 percent Ar fill gas is 4.5 hours, and in a 95 percent Ar and 5 percent N$_2$ fill gas is 1309 hours. Thus, based on the presently desired performance criteria, HfN may be deemed a suitable ceramic matrix for the ceramic composite defined herein assuming a suitable fill gas composition is chosen. A fill gas other than Ar, or a partial vacuum, can be used as long as the N$_2$ pressure is high enough to stabilize the HfN coating for at least 750 h according to reaction (A).

In another example, hafnium oxide (HfO$_2$) has a density $\rho_{ceramic}=9.68$ g cm$^3$, a molar mass $M_{ceramic}=210.49$ g mole, and a vapor pressure of the most volatile species, HfO, $p^*HfO=8.9\times10^{-9}$ atm at a filament temperature of 2300 K. The predicted time to remove 10 percent of a 3 µm thick HfO$_2$ coating at 2300 K is 402 hours. Since 402 hours is less than the presently desired lifetime of 750 hours, HfO$_2$ generally may not be considered a suitable ceramic matrix with respect to vaporization resistance for such a stipulated lifetime.

If a small amount, e.g. 10 ppm, of oxygen, O$_2$(g), is added to the fill gas, however, the value of p*HfO is fixed by the equilibrium of chemical reaction (B):

$$HfO_2 = HfO(g) + \tfrac{1}{2}O_2(g) \tag{B}$$

as $p^*_{HfO}=7.4\times10^{-12}$ atm. The vaporization of HfO$_2$ is then controlled by vaporization of the species HfO$_2$, where $p^*HfO_2=2.0\times10^{-11}$ atm. Inclusion of 10 ppm O$_2$ in the fill gas thus increases the predicted time to remove 10 percent of a 3 µm thick HfO$_2$ coating to $1.29\times10^5$ hours according to equation [1]. Since $1.29\times10^5$ hours is much greater than the presently desired lifetime of 750 hours, it can be seen that with a suitable minor modification of the gas fill composition, HfO$_2$ may become a suitable ceramic matrix for use in a ceramic composite in such a high temperature environment. The equivalent predicted time to remove 10 percent of a 3 micrometer thick HfO$_2$ coating at a heating element temperature of 2500 K is 1637 hours. Since 1637 hours is greater than the presently desired lifetime of 750 hours, HfO$_2$ may be deemed a suitable ceramic matrix for a ceramic composite if a suitably modified fill gas composition is selected.

It has also been recognized herein that the ceramic material 62 should be chemically stable when in contact with the included nanoparticle material 64 at a chosen filament temperature. That is, the ceramic matrix 62 should not participate in an exchange reaction with the nanoparticle material 64, nor should the ceramic matrix 62 dissolve an appreciable amount of the nanoparticle material 64 in solid solution. For example, a ceramic composite comprising a Ta$_{0.513}$C$_{0.487}$ ceramic matrix and Hf nanoparticles has been proposed. A possible reaction between Ta$_{0.513}$C$_{0.487}$ and Hf is:

$$Ta_{0.513}C_{0.487} + 0.513Hf = Hf_{0.513}C_{0.487} + 0.513Ta \tag{C}$$

The value of the Gibbs energy change, $\Delta G$, for this reaction at 2300 K, is calculated to be −37140 J. Since only those chemical reactions proceed for which the a value of the Gibbs energy change is less than zero, reaction (C) will proceed to the right at 2300 K and Ta$_{0.513}$C$_{0.487}$ and Hf can be considered thermodynamically incompatible with respect to the exchange reaction (C). Reactions of Ta$_{0.513}$C$_{0.487}$ with other candidate nanoparticle elements (including but not limited to Os, Re, Au) however may yield positive values of $\Delta G$, indicating that the corresponding ceramic material/nanoparticle combinations are unconditionally stable at the temperatures of interest.

In another example, the ceramic composite comprising a HfN ceramic matrix and W nanoparticles has been proposed. A possible reaction between HfN and W is:

$$HfN + 2W = W_2N + Hf \tag{D}$$

Literature on phase stability and thermodynamic properties of high temperature materials indicates that tungsten nitrides are not stable, thus reaction (D) and any other reactions similar to (D) that would form tungsten-nitrides will not occur. The combination of HfN ceramic with W nanoparticles is thus expected to be a stable ceramic composite in the temperature range of interest.

In addition to HfN, a ceramic composite including a HfO$_2$ ceramic matrix and W nanoparticles has also been described above. A possible reaction between HfO$_2$ and W may be represented by reaction (E) as follows:

$$HfO_2 + W = WO_2 + Hf \tag{E}$$

The value of the Gibbs energy change, $\Delta G$, for this reaction at 2300 K, is calculated to be +519700 J. Since only those chemical reactions proceed for which the value of the Gibbs energy change is less than zero, HfO$_2$ and W are compatible with respect to the exchange reaction (E). Because the value of the Gibbs energy change of reaction (E) is so large and positive, the solid solubility of W in HfO$_2$ is expected to be low. Thus, a system including an HfO$_2$ ceramic material and W nanoparticles is thus expected to result in a stable ceramic composite coating in the temperature range of interest.

It has further been recognized herein that the ceramic material 62 should be chemically stable when in contact with a heating element upon which it is disposed. That is, the ceramic matrix 62 should not participate in an exchange reaction with the heating element material, nor should it dissolve an appreciable amount of the heating element material in solid solution.

For example, thermodynamic calculations of the W—Ta—C ternary phase diagram at 2300 K show that the candidate ceramic material $Ta_{0.513}C_{0.487}$ is likely to react partially with a W heating element to produce a small amount of a $(Ta,W)_2C$ carbide solid solution and a layer of W-rich (W,Ta) alloy. This predicted reaction may or may not be deleterious to a 3 μm $Ta_{0.513}C_{0.487}$ coating on a W heating element. According to this criterion, $Ta_{0.513}C_{0.487}$ is a potential ceramic matrix for use in a ceramic composite as defined herein, but one that is lower ranked than candidate ceramic materials that can be shown to have essentially no chemical reactions with the underlying W heating element.

The same example shown under reaction (A) above that shows that HfN and W nanoparticles are chemically compatible also shows that HfN and a W heating element are chemically compatible. Similarly, the example shown under reaction (E) above that shows that $HfO_2$ and W nanoparticles are chemically compatible, also shows that $HfO_2$ and a W heating element are chemically compatible according to the design criteria disclosed herein.

The techniques illustrated in the above-described examples may be used to determine whether candidate materials systems are suitable for use in an improved incandescent lamp having a ceramic composite for selective emission according to the teachings herein. Thus, in accordance with one embodiment of the invention as described above, an incandescent lamp adapted with a ceramic composite system may include a base, a light transmissive envelope, a W heating element or filament, a ceramic composite coating comprising a HfN ceramic and included W nanoparticles disposed on the heating element. The light transmissive envelope may maintain a vacuum or a fill gas. In one embodiment, the fill gas contained by the envelope may comprise an inert gas, where the inert gas may comprise at least about 38 Torr of $N_2$.

In accordance with another embodiment of the invention as described above, an incandescent lamp adapted with a ceramic composite coating may include a base, a light transmissive envelope, a W heating element or filament, a ceramic composite coating comprising a HfN ceramic and included nanovoids disposed on the heating element, and a fill gas contained by the envelope and comprising an inert gas where the inert gas may comprise at least about 38 Torr of $N_2$.

In accordance with yet another embodiment of the invention as described above, an incandescent lamp adapted with a ceramic composite for selective emission may include a base, a light transmissive envelope, a W heating element or filament, a ceramic composite coating comprising a $HfO_2$ ceramic and included W nanoparticles disposed on the heating element, and a fill gas comprising an inert component (e.g., Ar) and 10 ppm $O_2$. This fill gas phase can be modified within limits, e.g. by additions of $N_2$ to desirably modify its thermal conductivity and/or changes in the $O_2$ concentration, while still maintaining a long lifetime for the ceramic composite coating with respect to vaporization.

The previous examples are intended to illustrate specific material screening methodologies used to identify candidate materials in accordance with the chemical stability specifications delineated above. Although the above-described examples employ certain assumptions to determine material compatibility (e.g., that no more than 10 percent of the ceramic composite should be allowed to vaporize over a desired design lifetime when operating at 2300k), the techniques illustrated herein are extensible and should not be limited to the described values. Similarly, although only certain materials have been described in detail, the associated methodologies are intended to be read expansively and may be applied to a larger variety of materials than those illustrated. In particular, although the previous example methodologies assume the heating element to be composed of tungsten, heating elements composed of other materials such as, but not limited to, carbon, osmium, rhenium and molybdenum may similarly be employed in connection with the ceramic matrix composite described herein.

EXAMPLE 1

In one example, an incandescent lamp is made. The incandescent lamp includes a base, a heating element coated with a high temperature emissive ceramic composite and a light transmissive envelope attached to the base around the heating element. Before the heating element is mounted to the base, the ceramic composite is formed on the heating element. To form the ceramic composite, silica nanoparticles having a particle size of about 400 nm are assembled through electrophoresis or evaporation onto the heating element. Chemical vapor deposition (CVD) of silica is then used to bridge the silica nanoparticles to form an interconnected structure. A further CVD process is performed to infiltrate the silica matrix and form a 50 nm HfN ceramic shell around the silica nanoparticles. The silica particles are etched out with hydrofluoric acid. Because the HfN has a plasma frequency $\omega_p$ such that $\hbar\omega_p$ is greater than 8 eV indicating strong metallic behavior and the dielectric constant of the resulting void space is approximately one, a sufficient dielectric contrast is provided. The coated heating element is then mounted within the incandescent lamp and the envelope is attached and a fill gas comprising at least 38 Torr of $N_2$ is provided. Current is passed through the base to the ceramic composite coated heating element causing the ceramic composite to selectively reflect photons having a wavelength greater than about 700 nm and to emit photons having a wavelength between about 400 nm and about 700 nm at temperatures greater than about 2300 Kelvin for at least about 100 hours.

EXAMPLE 2

In a second example, another incandescent lamp is made. The incandescent lamp includes a base, a tungsten filament coated with a high temperature emissive ceramic composite and a light transmissive envelope attached to the base around the tungsten filament. Before the tungsten filament is mounted to the base, the ceramic composite is formed on the filament. Composite nanoparticles consisting of a 150 nm tungsten core and a 100 nm coating of $HfO_2$ are assembled on the filament using electrophoresis. The assembled particles are then sintered to form a monolithic coating on the tungsten filament. The coated filament is then mounted within the incandescent lamp and the envelope is attached and a fill gas comprising Ar and 10 ppm $O_2$. Current is passed through the base to the ceramic coated filament causing the ceramic coating to selectively reflect photons having a wavelength greater than about 700 nm and to emit photons having a wavelength between about 400 nm and about 700 nm at temperatures greater than about 2300 Kelvin for at least about 100 hours.

While only certain features of the invention have been illustrated and described herein, many modifications and changes may occur to those skilled in the art. It is, therefore, to be understood that the appended claims are intended to cover all such modifications and changes as may fall within the spirit and scope of the invention. Additional claims to the subject matter described herein may be found in the following US patent applications concurrently filed herewith: U.S. patent application Ser. No. 11/396184 entitled ARTICLE INCORPORATING A HIGH TEMPERATURE CERAMIC COMPOSITE FOR SELECTIVE EMISSION; U.S. patent application Ser. No. 11/394500 entitled LIGHT SOURCE INCORPORATING A HIGH TEMPERATURE CERAMIC COMPOSITE FOR SELECTIVE EMISSION; and U.S. patent application Ser. No. 11/394501 entitled LIGHT SOURCE INCORPORATING A HIGH TEMPERATURE CERAMIC COMPOSITE AND GAS PHASE FOR SELECTIVE EMISSION.

What is claimed is:

1. A method comprising:
    applying current to a composition comprising a first material and a second material interspersed within the first material to form a structure such that the first and second materials maintain a periodicity of distribution between about 100 nm and about 1000 nm; and
    heating the composition to a temperature greater than about 2000 Kelvin to cause the emission or transmission of photons having a wavelength between about 400 nm and about 700 nm and the reflection of photons having a wavelength greater than about 700 nm for a duration of at least about 10 hours,
    wherein at least one of the first material and the second material comprises a material selected from the group consisting of HfC, NbC, $W_2C$, TaC, ZrC, HfN, $Nb_2N$, $Ta_2N$, ZrN, $HfB_2$, $TaB_2$, $ZrB_2$, $W_2B$, C and combinations of two or more thereof.

2. The method of claim 1, further comprising heating the composition to a temperature greater than about 2300 Kelvin to cause the emission or transmission of photons having a wavelength between about 400 nm and about 700 nm and the reflection of photons having a wavelength greater than about 700 nm for a duration of at least about 100 hours.

3. The method of claim 1, further comprising heating the composition to a temperature greater than about 2000 Kelvin to cause the emission or transmission of photons having a wavelength between about 400 nm and about 700 nm and the reflection of photons having a wavelength greater than about 700 nm for a duration of at least about 750 hours.

* * * * *